2,955,948
GLASS DECOLORIZING METHOD

William B. Silverman, Toledo, Ohio, assignor to Owens-Illinois Glass Company, a corporation of Ohio No Drawing. Filed May 8, 1958, Ser. No. 733,828

5 Claims. (Cl. 106—52)

The present invention relates to a method of continuously producing molten color-controlled homogeneous glass and more particularly to such a method utilizing a selenium-enriched frit which is added to molten glass and to the frit composition.

The present application constitutes a continuation-in-part of my earlier filed application Serial No. 718,024, filed in the United States Patent Office on February 27, 1958.

In decolorizing flint and other container glasses, selenium has found wide application. However, only about 10% to 15% of the selenium added to the glass batch is retained in the finished glass, primarily because of the low boiling point of the selenium and any of its various practical compounds and/or the high vapor pressures which such selenium compounds develop at glass batch melting temperatures. Many various selenium compounds, such as sodium and barium selenates and selenides have been tried as such additives, but without success. In addition, certain other additions to the glass batch aggravate the loss of selenium. For example, arsenic is commonly added to flint glass to reduce the iron oxide inherently present therein, but the addition of arsenic merely aggravates the loss of selenium.

It has been determined that the loss of selenium in the manufacture of flint glass is a function of (1) the ease of vaporization of selenium before sintering of the batch occurs in the glass furnace, (2) the temperature of the molten bath, (3) the time of holding the molten bath at melting temperature, and (4) the equilibrium constant between the batch elements and the selenium.

The present invention now proposes the addition of selenium in the form of a selenium-enriched frit. Such frits, when manufactured in accordance with the techniques set forth in my above-identified pending application, may contain up to 1% selenium, and these frits are added to the molten glass in the forehearth of the glass furnace as the glass is being conveyed from the molten bath to its point of use. The frit is dispersed in the molten glass by the use of conventional dispersing techniques, as described in connection with my above-identified pending application.

This invention is concerned primarily with the specific frit compositions which may be so utilized. Such compositions may be generally defined as containing as an essential decolorizing agent selenium which is present predominantly in its $Se^{+4}$ state. It is well known that selenium can exist in four different valence states; namely as $Se^{-2}$, $SeO$, $Se^{+4}$ and $Se^{+6}$. I have found that the addition of an oxidizing agent, such as niter ($KNO_3$), in the frit composition aids in the obtaining of selenium in its $Se^{+4}$ state and in which state selenium is most effective as a decolorizer.

I have also found that such frits may incorporate arsenic oxide ($As_2O_3$) as one of the constituents. Arsenic oxide, in and of itself, also is highly volatile and advantageously is added to the molten glass at its point of passage through the forehearth.

It has been found that by using the techniques and compositions of this invention the total selenium addition can be reduced by as much as 90% from that needed for direct selenium addition to the batch, i.e., effective decolorizing action can be obtained by the use of as little at $\frac{1}{10}$ as much total selenium when added as a frit.

It is, therefore, an important object of the present invention to provide an improved method of decolorizing flint glasses or the like by the addition of a selenium-enriched frit to molten glass at a glass-melting forehearth.

It is another important object of the present invention to provide an improved method for the decolorizing of molten glass by the addition to the molten glass of a selenium-enriched frit, the active decolorizing ingredient of which is selenium in its $Se^{+4}$ state.

Yet another important object of this invention is the provision of an improved method of decolorizing glass by the addition to molten glass of a selenium-enriched frit consisting essentially of selenium, niter, and arsenic oxide.

It is a still further object of this invention to provide an improved method of decolorizing glass by the addition thereto of a frit containing from about 0.07% to 0.24% selenium predominantly in its $Se^{+4}$ state.

One additional object is the provision of a selenium enriched frit in which the selenium content exists predominantly in its $Se^{+4}$ state.

It is still another important object to provide a frit for decolorizing flint glass and having as essential constituents selenium, arsenic and an oxidizing agent.

Other objects and advantages of the invention will appear from the following detailed description taken in conjunction with the annexed claims.

As heretofore explained, the present invention proposes the addition of a selenium-enriched frit to molten glass, as in a glass furnace forehearth. The manipulative steps involved in the addition of such frits to the forehearth are described and claimed in my above-identified pending application, Serial No. 718,024. The present invention is concerned primarily with the method involving the addition of a specified frit composition.

Such selenium enriched frits are preferably formed in a blanket fed electric melter of the type disclosed in my earlier filed application, and the high percentage of selenium is retained within the frit because of the condensation and holding of selenium in the frit batch by the relatively cold batch blanket.

Table I, hereinafter set forth, lists six typical selenium-enriched frit compositions suitable for utilization in the method of the present invention.

TABLE I

*Frit compositions*

[Parts by wt.]

| Ingredients | A | B | C | D | E | F |
|---|---|---|---|---|---|---|
| Sand (lbs.) | 50 | 50 | 52.5 | 50 | 50 | 52.5 |
| Soda Ash (lbs.) | 15.6 | 25.3 | 26.5 | 25.3 | 17 | 26.5 |
| Limestone (lbs.) | 17.4 | 12.4 | 12.4 | 12.4 | 16.0 | 12.5 |
| Feldspar (lbs.) | 5.0 | 6.0 | | 6.0 | 5.5 | |
| Selenium (oz.) | 1.5 | 3.0 | 3.0 | 3.0 | 3.0 | 3.0 |
| Niter (oz.) | 19.5 | 11.0 | 11.0 | 11.0 | 6.5 | 6.0 |
| Arsenic Oxide (oz.) | | | | 8.0 | | |
| Selenium Retention (percent) | 58 | 71 | 50 | 100 | 35 | 84 |
| Percent Selenium in Frit | 0.073 | 0.165 | 0.137 | 0.24 | 0.096 | 0.201 |

The frit is, in essence, a soda-lime flint glass to which has been added selenium, niter, and arsenic in comparatively minute amounts. Thus, the frit can be melted by conventional techniques as summarized in Tables IXBI and IXBII of Tooley's "Handbook of Glass Manufacture," page 245, said handbook being published in 1953 by Ogden Publishing Company, New York, New York.

The niter, of course, is an alkali metal salt and serves as an oxidizing agent. The ratio, by weight of oxidizing agent to selenium ranges from 13:1 to 2:1.

It will be noted that the percentage of selenium present in the frit compositions of Table I varies from 0.07% of composition A to 0.24% of composition D. The degree of selenium retention in the compositions when compared with the amount of selenium initially added ranges from 35% retention for composition E to 100% retention for composition D.

It will be noted that each of the compositions A through F, inclusive, includes niter as an oxidizing agent. I have found that the addition of niter aids in the retention of selenium within the frit compositions and further tends to shift the equilibrium balance between the valence states of selenium so that the major part of the selenium is present as the +4 valence of $SeO_2$, the remainder of the selenium being distributed between its zero and +6 valence states.

The addition of arsenic as in frit composition D, shifts the oxidation equilibrium of selenium to some extent so that smaller amounts of the selenium occurs as the +4 valence and some small percentage of the selenium may actually exist as the −2 valence or as the selenide. Arsenic and its oxide are, of course, highly volatile and the final glass composition contains selenium and arsenic in a ratio of about 1 to 1.

A comparison between the effects of arsenic and niter would indicate that arsenic has a reducing effect on selenium as compared with the oxidizing effect of niter. Thus, in order to insure the presence of the selenium predominantly in its +4 valence state, I prefer to utilize the combination of selenium, niter, and arsenic oxide in the ratio of 3:11:8, i.e., the ratio of composition D. The valence states of selenium in the frit have actually been determined for four of the compositions of Table I and are set forth in Table II, as follows:

TABLE II

*Valence states of selenium in frit*

[Expressed as percent of total frit Se]

| Frit Composition | $Se^0$ | $Se^{+4}$ | $Se^{+6}$ |
| --- | --- | --- | --- |
| A | 6.8 | 79.5 | 5.5 |
| D | 12.3 | 77.3 | 9.4 |
| E | 4.1 | 88.5 | 3.1 |
| F | 7.5 | 90.5 | 2.5 |

In order to determine the effectiveness of the frits of Table I in decolorizing flint glass, a typical flint glass composition was formulated, the base glass composition having the following ingredients:

TABLE III

| Ingredient: | Parts by weight |
| --- | --- |
| Sand | 100 |
| Soda ash | 32.4 |
| Dolomite | 10.7 |
| Calcite lime | 17.3 |
| Feldspar | 10.5 |
| Gypsum | 1.1 |

Controls I, III and IV in each of the following tables contained 0.0625 part by weight of charcoal. None of the other batches contained charcoal.

The experimental results utilizing frits A, B, D and E were as follows:

TABLE IV

*Decolorized glass batches*

| Ingredients | Control Nos. | | Batch Nos. | | | | |
| --- | --- | --- | --- | --- | --- | --- | --- |
| | I | II | III | IV | V | VI | VII |
| Arsenic Oxide (percent) | 0.04 | | | | | | |
| Selenium (percent) | 0.0025 | | | | | | |
| Frit D | | | 0.5 | 0.2 | 0.5 | 0.2 | 0.5 |
| Niter | | | | | 0.5 | 0.5 | 0.5 |
| Oz. Se per ton sand | 0.8 | 0 | 0.4 | 0.16 | 0.4 | 0.16 | 0.4 |
| Oz. $As_2O_3$ per ton sand | 12.0 | 0 | 0.4 | 0.16 | 0.4 | 0.16 | 0.4 |
| Dominant Wave Length | 614.8 | 494 | 601 | 596 | 578 | 601 | 582 |
| Purity (percent) | 1.36 | 2.59 | 4.2 | 2.1 | 7.4 | 6.0 | 8.0 |
| Brightness (percent) | 68.2 | 73.3 | 66.4 | 67.9 | 63.8 | 60.5 | 64.7 |

TABLE V

*Decolorized glass batches*

| Ingredients | Control No. | | Batch No. | | | | | |
| --- | --- | --- | --- | --- | --- | --- | --- | --- |
| | I | II | VIII | IX | X | XI | XII | XIII |
| Arsenic Oxide (percent) | 0.4 | | | | | | | |
| Selenium (percent) | 0.0025 | | | | | | | |
| Frit B | | | 0.1 | 0.2 | 0.4 | | | |
| Frit E | | | | | | 0.2 | 0.4 | 0.8 |
| Oz. Se per ton sand | 0.8 | 0 | 0.08 | 0.16 | 0.32 | 0.08 | 0.16 | 0.32 |
| Oz. $As_2O_3$ per ton sand | 12.0 | 0 | | | | | | |
| Dominant Wave Length | 614.8 | 494 | 498 | 620 | 607 | 611 | 620 | 614 |
| Purity (percent) | 1.36 | 2.59 | 1.59 | 1.93 | 3.1 | 4.9 | 5.7 | 3.8 |
| Brightness (percent) | 68.2 | 73.3 | 69.1 | 67.3 | 64.0 | 63.9 | 60.00 | 62.9 |

TABLE VI

*Decolorized glass batches*

| Ingredients | Control No. | | Batch No. | | |
| --- | --- | --- | --- | --- | --- |
| | III | IV | XIV | XV | XVI |
| Arsenic Oxide | 0.4 | 0.4 | | | |
| Selenium | .0025 | | | | |
| Cobalt Oxide | .000325 | | | | |
| Frit A | | | 0.5 | 1.0 | 1.5 |
| Oz. Se per ton sand | 0.8 | | 0.11 | 0.22 | 0.33 |
| Dominant Wave Length | 609 | 508 | 574 | 589 | 595 |
| Purity | 1.8 | 2.7 | 3.0 | 5.8 | 6.4 |
| Brightness | 76.7 | 86.1 | 77.3 | 74.3 | 73.9 |

From the foregoing data, it will be seen that the present invention provides a new and novel method of decolorizing glass by the addition to flint glass of a frit which is selenium-enriched and which is much more effective than the addition of selenium as one of the original batch ingredients. For example, the addition of 0.8 oz. of selenium per ton of sand in control I was hardly more effective in its decolorizing action than the addition of 0.08 oz. of selenium per ton of sand in batch No. XI, wherein the selenium was added as the frit composition E. Further, from Table IV it will be noted that the addition of 40% as much selenium in batch XVI gave substantially as good results as the direct addition of selenium to the batch control III, and this effect was obtained by the addition of the frit A which contains only 0.073 percent selenium.

Of particular interest is the effectiveness of the greatly reduced amounts of arsenic oxide in frit composition D as illustrated in Table IV. In control I, the addition of 0.8 oz. of selenium per ton of sand in combination with 12.0 oz. of arsenic oxide per ton of sand were necessary to obtain adequate decolorization. On the other hand, upon the addition of the frit D, results of the same order were obtained upon the addition of only 0.16 oz. of selenium per ton of sand and 0.16 oz. of arsenic oxide per ton of sand.

From the foregoing data, it will be readily appreciated that the present invention provides a method whereby the amount of selenium and/or arsenic oxide may be greatly reduced by the addition of a selenium-enriched frit to molten glass at a glass furnace forehearth. Preferably, such selenium-enriched frits contain from 0.07% selenium to about 0.25% selenium. If an arsenic addition is desired, the arsenic may also be incorporated in the frit so that its effectiveness may also be increased. The utilization of niter to bring about the desired valence state of the selenium content is to be desired, particularly where arsenic is present. A single preferred species of frit is composition D as above set forth, wherein the active ingredients of the frit comprise selenium, niter, and arsenic oxide in a ratio of 3:11:8.

What is claimed is:

1. In a method of making colorless glass including the melting of a flint glass batch and the flowing of a molten glass stream through a forehearth, the improvement of adding to the forehearth stream a decolorizing soda-lime flint glass frit having a selenium content of at least 0.07%, the selenium being present predominantly in its $Se^{+4}$ valence state, the frit addition being made at a rate to yield at least 0.08 ounce of selenium per ton of sand in the composite glass stream.

2. The method of claim 1, wherein the frit also contains niter at a selenium to niter ratio of from 13 to 1 to 2 to 1.

3. The method of claim 1, wherein the frit also contains niter and arsenic oxide at a selenium:niter:arsenic oxide ratio of 3:11:8.

4. The method of claim 1, wherein the frit contains from 0.07 to 0.24% selenium.

5. The method of claim 1, wherein the frit is made from the following batch ingredients:

| Ingredients: | Parts by weight |
|---|---|
| Sand (lbs.) | 50–52.5 |
| Soda ash (lbs.) | 15.6–26.5 |
| Limestone (lbs.) | 12.4–17.4 |
| Feldspar (lbs.) | 0–6.0 |
| Selenium (oz.) | 1.5–3.0 |
| Niter (oz.) | 6.0–19.5 |
| Arsenic oxide (oz.) | 0–8.0 |

References Cited in the file of this patent

UNITED STATES PATENTS 2,229,416     Lyle     Jan. 21, 1941